United States Patent Office 3,296,176
Patented Jan. 3, 1967

3,296,176
INTERPOLYMER LATICES
Joel Fantl, Springfield, Mass., assignor to Monsanto Company, St. Louis, Mo., a corporation of Delaware
No Drawing. Filed Mar. 3, 1965, Ser. No. 436,919
7 Claims. (Cl. 260—29.6)

This invention relates to novel interpolymer latices for use in the preparation of surface coating compositions. More particularly, this invention relates to improved vinylidene interpolymer latices useful in the preparation of organic solvent dispersed printing inks.

U.S. Patent 2,767,153 describes a class of interpolymer latices which have found wide commercial application in surface coating compositions. However, these interpolymer latices have been found to be unsuitable for use in formulating organic solvent dispersed printing inks. It has been observed in this regard that upon conversion of the aqueous latex to an organic solvent dispersion of the interpolymer particles the individual particles become greatly enlarged or swollen and tend to split and/or at least partially dissociate. This condition when severe renders it impossible to formulate a printing ink. Even when marginal this condition adversely affects the flow characteristics or rheology of the printing ink as evidenced by the occurrence of a severe "legging" problem. The term "legging" is used by the printing ink industry to describe the phenomena wherein the printing ink instead of depositing uniformly on the surface to be printed tends to draw into thin fibrous tacky strands and then splatter upon said surface. This obviously results in a totally unsatisfactory printed surface. For example, when characters or letters are to be printed, the characters or letters appear blurred and distorted much like when attempting to write with ink on a blotter or unsized paper.

An object of the present invention is to provide novel vinylidene interpolymer latices.

Another object is the provision of novel interpolymer latices suitable for conversion into organic solvent dispersions useful as printing inks.

Another object is the provision of a novel process for the preparation of said novel vinylidene interpolymer latices.

These and other objects are attained through the provision of vinylidene interpolymer latices having an overall composition of from 6 to 18% and preferably from 10 to 15% by weight of an unsaturated nitrile as hereinafter disclosed, from 20 to 45% and preferably from 28 to 35% by weight of an unsaturated ester as hereinafter disclosed, from 1 to 5% by weight of an unsaturated monocarboxylic acid as hereinafter disclosed and, correspondingly, from 32 to 73% and preferably from 45 to 61% by weight of a monovinylidene aromatic hydrocarbon, wherein the individual interpolymer particles comprise an inner mass of a particular interpolymer composition and an outer surface-oriented mass of a different composition; said inner mass having an interpolymer composition of (1) from 20 to 40% and preferably from 25 to 35% by weight of said unsaturated nitrile and, correspondingly,
(2) from 80 to 60% and preferably from 75 to 65% by weight of said monovinylidene aromatic hydrocarbon;

said outer surface-oriented mass having an interpolymer composition of (1) from 3 to 12% and preferably from 5 to 9% by weight of said unsaturated nitrile,
(2) from 25 to 50% and preferably from 32 to 42% by weight of said unsaturated ester,
(3) from 1 to 5% by weight of said unsaturated monocarboxylic acid and, correspondingly,
(4) from 33 to 71% and preferably from 44 to 62% by weight of said monovinylidene aromatic hydrocarbon.

These vinylidene interpolymer latices are prepared by a process which comprises sequentially interpolymerizing in an aqueous media a first mixture of monomers having a composition substantially that of the above inner mass of the interpolymer and then a second mixture of monomers having a composition substantially the same as that of the above outer surface-oriented mass of the interpolymer.

The following examples are presented in illustration of the invention and are not intended as limitations on the scope thereof. Where parts are mentioned, they are parts by weight.

EXAMPLE I

Prepare the following premixes to be used in preparing a 40% solids interpolymer latex:

|  | Parts | Approx. percent of premix |
|---|---|---|
| Monomer premix "A": |  |  |
|    Styrene | 56 | 70 |
|    Acrylonitrile | 24 | 30 |
| Monomer premix "B": |  |  |
|    Styrene | 172 | 52 |
|    Acrylonitrile | 24 | 7 |
|    2-ethylhexyl acrylate | 128 | 38.5 |
|    Methacrylic acid | 8 | 2.5 |
| Catalyst premix: |  |  |
|    Water | 120 |  |
|    Potassium persulfate | 2 |  |
|    Sodium tert.-octyl phenol polyether sulfate | 5 |  |
| Kettle Charge: |  |  |
|    Water | 471 |  |
|    Tert.-octyl phenoxyethanol | 3.5 |  |
|    Sodium tert.-octyl phenol polyether sulfate | 5 |  |

Add the kettle charge to a glass-lined reaction vessel fitted with a reflux condenser and an agitator. Bring the kettle charge to reflux temperature and add thereto 10% of the catalyst premix. The remaining catalyst premix is then slowly added, amid constant agitation and at reflux temperature, over a 100-minute period. During the first 20 minutes of the 100-minute period, slowly add all of monomer premix "A." During the last 80 minutes of the 100-minute period, slowly add all of monomer premix "B." Maintain the resultant reaction mixture at reflux temperature until the polymerization reaction is substantially complete. Cool the resultant latex to about room temperature and adjust the pH thereof to about 9.0–9.5 with a 28% aqueous solution of ammonia. The latex is then stabilized with the addition of a mixture of 25 parts of water and 5 parts of sodium lauryl sulfate. As a result of this reaction, there is obtained a 40% solids grain- and lump-free interpolymer latex having an average particle size of about 0.05±0.01 micron. The overall interpolymer composition, including both core and shell, is 55.5% styrene, 11.5% acrylonitrile, 31.0% 2-ethylhexyl acrylate and 2.0% methacrylic acid.

EXAMPLE II

Repeat Example I using the same catalytic premix and the same kettle charge, but in this instance use the following monomer premixes:

|  | Parts | Approx. Percent of Premix |
|---|---|---|
| Monomer premix "A": | | |
| Styrene | 64 | 80 |
| Acrylonitrile | 16 | 20 |
| Monomer premix "B": | | |
| Styrene | 193 | 58 |
| Acrylonitrile | 40 | 12 |
| 2-ethylhexyl fumarate | 83 | 25 |
| Methacrylic acid | 16 | 5 |

At the end of the polymerization reaction, there is obtained a 40% solids grain- and lump-free interpolymer latex having an average particle size of about 0.09±0.02 micron. The overall interpolymer composition, including both core and shell, is 62.5% styrene, 13.5% acrylonitrile, 20.0% 2-ethylhexyl fumarate and 4.0% methacrylic acid.

EXAMPLE III

Repeat Example I using the same catalyst premix and the same kettle charge, but in this instance use the following monomer premixes:

|  | Parts | Approx. Percent of Premix |
|---|---|---|
| Monomer premix "A": | | |
| Styrene | 48 | 60 |
| Methacrylonitrile | 32 | 40 |
| Monomer premix "B": | | |
| Styrene | 152 | 46 |
| Methacrylonitrile | 10 | 3 |
| 2-ethylhexyl methacrylate | 166 | 50 |
| Acrylic acid | 4 | 1 |

At the end of the polymerization reaction, there is obtained a 40% solids grain- and lump-free interpolymer latex having an average particle size of about 0.07±0.01 micron. The overall interpolymer composition, including both core and shell, is 48.5% styrene, 10.3% methacrylonitrile, 40.2% 2-ethylhexyl methacrylate and 1.0% acrylic acid.

EXAMPLE IV

Repeat Example I using the same catalyst premix and the same kettle charge, but in this instance use the following monomer premixes:

|  | Parts | Approx. Percent of Premix |
|---|---|---|
| Monomer premix "A": | | |
| Alphamethyl styrene | 64 | 80 |
| Acrylonitrile | 16 | 20 |
| Monomer premix "B": | | |
| Alphamethyl styrene | 230 | 69 |
| Acrylonitrile | 10 | 3 |
| Decyl acrylate | 82 | 25 |
| Crotonic acid | 10 | 3 |

At the end of the polymerization reaction, there is obtained a 40% solids grain- and lump-free interpolymer latex having an average particle size of about 0.10±0.01 micron. The overall interpolymer composition, including both core and shell, is 71.3% alphamethyl styrene, 6.3% acrylonitrile, 20.0% decyl acrylate and 2.4% crotonic acid.

The following example is presented, for comparative purposes, to evidence the superiority, with respect to swelling and particle integrity in organic dispersions, of the latices of this invention over latices representing the closest known art. Example V, following, corresponds to Example I of U.S. 2,767,153.

EXAMPLE V

Prepare the following premixes to be used in preparing a 50% solids interpolymer latex:

| Monomer premix "A": | Parts |
|---|---|
| Acrylonitrile | 6 |
| Styrene | 14 |
| Monomer premix "B": | |
| Styrene | 38 |
| 2-ethylhexyl acrylate | 40 |
| Methacrylic acid | 2 |
| Catalyst premix: | |
| Potassium persulfate | 0.5 |
| 30% solids isopropanol solution of an alkyl aryl polyether sulfate | 1.0 |
| Water | 25 |
| Reaction vessel charge: | |
| Alkyaryl polyether alcohol | 0.2 |
| Water | 75 |

Add the reaction vessel charge to a glass-lined reaction vessel fitted with a reflux condenser and an agitator. Bring the charge to reflux temperature and then slowly add the catalyst premix thereto over an 80-minute period. During the first 30 minutes of the 80-minute period, slowly add monomer premix "A" along with the first 30% of the catalyst premix and during the last 50 minutes of the 80-minute period, slowly add monomer premix "B" along with the remainder of the catalyst premix. Maintain the resultant reaction mixture at reflux temperature until the temperature peaks, at which time the polymerization reaction is substantially complete. Cool the resultant latex to room temperature and adjust the pH thereof to about 8-9 with a 28% aqueous solution of ammonia. As a result of this reaction, there is obtained a 50% solids grain- and lump-free interpolymer latex having an average particle size of about 0.10±0.02 micron. The overall interpolymer composition, including both core and shell, is 52% styrene, 67% acrylonitrile, 40% 2-ethylhexyl acrylate and 2% methacrylic acid.

The following example is presented to show the behavior of each of the latex formulations of Examples I-V when converted to hydrocarbon solvent dispersions for use as printing ink resins. It should be remembered that the latex of Example V is presented for comparative purposes to evidence the unsuitability of prior art compositions.

EXAMPLE VI

A series of five printing ink formations are prepared using the interpolymer latex from each of Examples I-V, respectively. In each instance, 60 parts of the interpolymer latex are slowly added to 25 parts of a 50% by weight solution of cyclized rubber in a hydrocarbon solvent having a boiling range of 474-498° F. and a K.B. value of 27-28 over a period of 10 minutes on a 3 roll mill steam heated to a temperature of 220-250° F. The mixture is milled at this temperature until the water in the latex has substantially evaporated. The mill is then cooled and 10 parts of the above hydrocarbon solvent are added and blended in. For the test purposes of this example the pigment and antioxidant, normally added at this point, are omitted. Each of the 5 samples are then heated on a steam bath at ca. 90° C. for 15 minutes. Microscopic examination of the interpolymer particles from the printing ink formulation compared in each instance with the corresponding interpolymer particles taken directly from a sample of the aqueous interpolymer latex shows that while those particles from the latexes of Examples I-IV are unaffected, i.e., no swelling, tack or dissociation, the particles originating from the latex of Example V are tacky, greatly swollen by the organic solvent and to a large extent split and/or partially dissociated. Attempts to roll print the unpigmented ink prepared from the latex of Example V results in severe "legging" (i.e., pulling of the ink strands into long tacky fibrous strands) and gelation. The unpigmented inks prepared using the latexes of Examples I–IV roll print very satisfactorily and exhibit no "legging" or gelation.

The interpolymer

The interpolymer latices of the present invention are prepared by the aqueous emulsion polymerization of particular mixtures of vinylidene monomers in critical proportions. As hereinafter discussed the interpolymer particles of which these latices are comprised have an overall composition of from 6 to 18% and preferably from 10 to 15% by weight of an unsaturated nitrile as hereinafter discloesd, from 20 to 45% and preferably from 28 to 35% by weight of an unsaturated ester as hereinafter disclosed, from 1 to 5% by weight of an unsaturated monocarboxylic acid as hereinafter disclosed and, correspondingly, from 32 to 73% and preferably from 45 to 61% by weight of a monovinylidene aromatic hydrocarbon. Each of these vinylidene monomers will hereinafter be discussed in greater detail. However, while the individual interpolymer particles may have the above overall composition, both the nature of the monomers and their relative percentage composition vary from the interior of the individual particles to the surface. Thus, the interior of the individual particles, hereinafter called the inner mass, are comprised solely of the unsaturated nitrile and the monovinylidene aromatic hydrocarbon with the unsaturated nitrile comprising from 20 to 40% and preferably from 25 to 35% by weight of the said inner mass and correspondingly, the monovinylidene aromatic hydrocarbon comprising from 80 to 60% and preferably from 75 to 65% by weight of the inner mass. The interpolymer composition distributed to the surface of these individual particles, hereinafter called the outer surface-oriented mass, has a composition comprising from 3 to 12% and preferably from 5 to 9% by weight of the unsaturated nitrile, from 25 to 50% and preferably from 32 to 42% by weight of the unsaturated ester, from 1 to 5% by weight of the unsaturated monocarboxylic acid and, correspondingly, from 33 to 71% and preferably from 44 to 62% by weight of the monovinylidene aromatic hydrocarbon. Thus, it can be seen that all of the unsaturated ester and unsaturated monocarboxylic acid as well as a portion of the unsaturated nitrile are contained in the said outer surface-oriented mass whereas the said inner mass comprises only unsaturated nitrile and monovinylidene aromatic hydrocarbon.

A wide variety of monovinylidene aromatic hydrocarbons may be used in the practice of this invention. Therefore, in place of the styrene and alpha-methyl styrene employed in the examples there may be substituted with equivalent results such other monovinylidene aromatic hydrocarbons as, for example, alpha-halo styrenes such as, e.g., alpha-chloro styrene; ring-substituted halo-styrenes such as, e.g., para-chloro styrene, 2,4-dichloro styrene, 2,5-dibromo styrene, etc.; ring-substituted alkyl styrenes such as, e.g., para-methyl styrene, alphamethyl paraethyl styrene, metaethyl styrene, para-isopropyl styrene, etc.; vinyl naphthalene, etc., mixtures of two or more such monovinylidene aromatic hydrocarbons may be used if desired.

The unsaturated esters to be used in accordance with the present invention are straight-chain or branched-chain aliphatic alcohol esters of fumaric, acrylic or methacrylic acid. The alcohol radicals should be saturated and should contain from 5 to 20 carbon atoms. In addition, the longest continuous chain of the alcohol radical should contain from 5 to 14 carbon atoms. If the alcohol radical contains a lesser number of carbon atoms or if the number of carbon atoms in the longest continuous chain is less than 5, the resultant latices will not dry to form continuous, adherent films at operating temperatures. On the other hand, if the alcohol radicals contain a greater number of carbon atoms or if the number of carbon atoms in the longest continuous straight chain is in excess of 14, the resultant latices will dry to form films which will be too soft and tacky for surface coating applications. Within these limitations, however, a wide variety of fumaric, acrylic and methacrylic acid esters may be used, representative of which are the esters formed by esterifying fumaric, acrylic or methacrylic acid with alcohols such as amyl alcohol, hexanol, 2-ethyl hexanol, 2-methyl pentanol, the oxo alcohol of an isobutylene dimer, heptyl alcohol, 3-methyl heptyl alcohol, the oxo alcohol of an isobutylene trimer, the oxo alcohol of a propylene dimer, octyl alcohol, the oxo alcohol of a propylene tetramer, cetyl alcohol, dodecyl alcohol, tridecyl alcohol, tetradecyl alcohol, etc. Mixtures of two or more such fumaric, acrylic or methacrylic acid esters may be used if desired.

The unsaturated nitrile employed in the practice of this invention may be acrylonitrile or methacrylonitrile or mixtures thereof.

The unsaturated monocarboxylic acid employed in the practice of this invention may contain from 3 to 10 carbon atoms. Exemplary of such acids are acrylic acid, methacrylic acid, cinnamic acid, atropic acid, and crotonic acid. Mixtures of two or more such unsaturated monocarboxylic acids may be used if desired.

Monomer proportions

The interpolymer latices of the present invention are obtained by interpolymerizing the above monomer components within a specific range of proportions substantially that of the final interpolymer desired. In discussing the monomer proportions it is most convenient to speak in terms of two monomer premixes. The first premix being designed to create the said inner mass of the interpolymer particles and the second premix being designed to create the said outer surface-oriented mass of the interpolymer particles.

The first monomer premix, which is designed to form the said inner mass, is a mixture of the unsaturated nitrile and the monovinylidene aromatic hydrocarbon in proportions such that the unsaturated nitrile comprises from 20 to 40% and preferably from 25 to 35% by weight and the monovinylidene aromatic hydrocarbon comprises, correspondingly, from 80 to 60% and preferably from 75 to 65% by weight.

The second monomer premix, which is designed to form the said outer surface-oriented mass, comprises a mixture of from 3 to 12% and preferably from 5 to 9% by weight of the unsaturated nitrile, from 25 to 50% and preferably from 32 to 42% by weight of the unsaturated ester, from 1 to 5% by weight of the unsaturated monocarboxylic acid and, correspondingly, from 33 to 71% and preferably from 44 to 62% by weight of the monovinylidene aromatic hydrocarbon.

The relative proportion of the first monomer premix to the second monomer premix is such that the resulting inner mass of the interpolymer particles will comprise from 10 to 35% of the total mass of the interpolymer particles. Thus, on the basis of 100 parts total of both the first and second monomer premixes, the first monomer premix will comprise from 10 to 35 parts by weight and the second monomer premix will comprise, correspondingly, from 90 to 65 parts by weight.

The polymerization reaction

The latices of the present invention are prepared by a special aqueous emulsion polymerization reaction, as hereinafter more fully explained, of the general type wherein the monomers to be polymerized are slowly added to an aqueous reaction vessel charge at the temperature of polymerization, an aqueous solution of polymerization catalyst and emulsifier being added along with the monomers.

A wide variety of emulsifying agents may be used alone or in admixture, such as salts of high molecular weight fatty acids, amino soaps, alkali metal salts of rosin acids, alkali metal salts of long-chain alkyl sulfates and sulfonates, ethylene oxide condensates of long-chain fatty acids, alcohols or mercaptans, sodium salts of sulfonated hydrocarbons, alkaryl sulfonates, etc. Representative emulsifiers include compounds such as sodium oleate, triethanol amine, sodium lauryl sulfate, salts of sulfosuccinic acid esters, the 2-ethylhexyl ester of sulfosuccinic acid, sodium salts of dioctyl sulfosuccinic acids, sodium salts of sulfated cetyl alcohol, etc. It is generally desirable to use about 0.1 to 5 parts of emulsifier per 100 parts of monomer mixture although somewhat greater or lesser amounts may be used if desired.

Representative of the water-soluble polymerization catalysts which may be used are compounds such as potassium persulfate, ammonium persulfate, and hydrogen peroxide. However, if desired, organo-soluble catalysts such as, for example, benzoyl peroxide, lauroyl peroxide, ditertiary butyl peroxide, cumene hydroperoxide, azo-bis-isobutyronitrile, etc., may be used dissolved in the monomer premixes in the desired proportions; in which case no aqueous catalyst premix need be used. Mixtures of two or more such polymerization catalysts may also be used if desired. The amount of catalyst to be used will generally fall within the range of about 0.01 to 1 part of polymerization catalyst per 100 parts of monomer mixture. Somewhat greater or lesser amounts of catalyst may be used if desired.

The amount of water to be used may be varied within comparatively wide limits. It is generally preferable, however, to use from about 100 to 250 parts of water per 100 parts of monomer mixture in order that the latices will have a solids content of from about 30 to 50% by weight. The amount of water may be increased or decreased, if desired, in order to provide a latex having a somewhat higher or lower solids content, e.g., from 20 to 55% by weight.

The various ingredients to be used in conducting the polymerization reaction are conveniently, but not necessarily, used in the form of an initial reaction vessel charge, a catalyst-emulsifier premix and two separate monomer premixes.

The initial reaction vessel charge comprises a major portion of the water to be used. It may also optionally contain a minor amount of the emulsifier, a minor amount of the catalyst, or both. The catalyst-emulsifier premix comprises a minor amount of the water to be used, and contains all or a major portion of the polymerization catalyst and all or a major portion of the emulsifier. Suitable quantities of conventional polymerization aids such as buffers, particle size regulators, activators, etc. may also be present in the reaction vessel charge, the catalyst-emulsifier premix, or both. Alternatively, of course, all of these ingredients may be charged independently to the kettle and then mixed therein.

In order to prepare latices in accordance with the present invention, the initial reaction vessel charge is first added to a suitable reaction vessel and the charge is then preferably brought to the desired reaction temperature and pressure before adding the remaining ingredients. The temperature may be varied within comparatively wide limits so that, for example, a temperature of from about 30° C. to 150° C. may be used with satisfactory results. The reaction should be conducted under pressure if a temperature above reflux temperature is to be used but it is preferably conducted at atmospheric pressure at reflux temperature or less. In general, the reaction is best controlled if conducted at atmospheric pressure and reflux temperature. The polymerization reaction is preferably conducted in the absence of oxygen.

Oxygen may be removed from the reaction vessel by any suitable means such as purging with nitrogen, bringing the reaction vessel charge to reflux temperature, etc.

After the initial reaction vessel charge has been brought to the desired temperature and pressure and the reaction vessel substantially purged of oxygen, the catalyst-emulsifier premix and the two monomer premixes are slowly added with agitation over about a 1–2 hour period. The catalyst-emulsifier premix is slowly added during the entire period. The first monomer premix is slowly added to the initial reaction vessel charge along with the first portion of the catalyst-emulsifier premix and the second monomer premix is slowly added along with the remainder of the catalyst-emulsifier premix. Addition of the second monomer premix is not started until the interpolymerization of the first monomer premix is at least 60% and preferably at least 80% complete so as to insure proper balance of the inner mass and the outer surface-oriented mass.

As a general rule, the polymerization reaction is incomplete at the end of the addition period and, as a result, in order to bring the reaction to substantial completion, it is generally necessary to maintain the reaction mixture at a temperature of polymerization for an additional period of time, usually about 1–20 hours. If the reaction is conducted at reflux temperature, it is substantially complete when a substantially constant boiling point is reached. A small percentage of unreacted monomer (e.g., about 5%) is present in the latex at the end of the polymerization reaction and, if desired, may be removed by any suitable means such as distillation, etc.

By conducting the polymerization reaction in this fashion, there is obtained an interpolymer latex that is substantially free of lumps and grains. The polymer particles in the latex will have an average particle size in the range of from about 0.03 to 1.0 micron and the latex will dry to form a continuous film at a temperature of about 2–10° C. or higher. For printing ink formulations, a particle size of from about 0.03 to 0.2 micron is preferred.

The latices of the present invention, as initially prepared, will normally have an acid pH. They may be used in this acid condition with satisfactory results. However, it is generally preferable that the pH of about 8–9 through the addition of a suitable amount of a basic material such as ammonia or an alkali metal or ammonium salt of a water-soluble organic or inorganic acid.

As has been indicated, the latices of the present invention are useful in the preparation of surface coating compositions and for such use are conventionally compounded with suitable pigments, fillers, protective colloiding agents, thickening agents, latex stabilizing agents, etc. They are specifically designed, however, for use in the formulation of organic solvent dispersed printing inks. Such inks may be prepared in conventional manner; for example, by the method exemplified by Example VI.

It is obvious that many variations may be made in the products and processes as set forth above without departing from the spirit and scope of this invention.

What is claimed is:

1. An aqueous latex containing interpolymer particles having an overall composition of from 6 to 18% by weight of (A) an unsaturated nitrile selected from the group consisting of acrylonitrile and methacrylonitrile, from 20 to 45% by weight of (B) an unsaturated ester selected from the group consisting of straight-chain and branched-chain saturated aliphatic alcohol esters of fumaric, acrylic and methacrylic acids containing from 5 to 20 carbon atoms in the alcohol moiety of which from about 5 to 14 carbon atoms comprise the longest continuous chain thereof, from 1 to 5% by weight of (C) an unsaturated monocarboxylic acid containing from 3 to 10 carbon atoms and, correspondingly, from 32 to 73% by weight of (D) a monovinylidene aromatic hydrocarbon, wherein said interpolymer particles comprise an inner mass of a particular interpolymer composition and an outer surface-oriented interpolymer of a different composition; said inner mass having an interpolymer composition of
- (1) from 20 to 40% by weight of (A) and, correspondingly,
- (2) from 80 to 60% by weight of (D);

said outer surface-oriented interpolymer having a composition of
- (1) from 3 to 12% by weight of (A),
- (2) from 25 to 50% by weight of (B),
- (3) from 1 to 5% by weight of (C) and, correspondingly,
- (4) from 33 to 71% by weight of (D).

2. An aqueous latex as in claim 1 wherein component (D) is styrene.

3. An aqueous latex as in claim 2 wherein component (A) is acrylonitrile.

4. An aqueous latex as in claim 2 wherein component (B) is 2-ethylhexyl acrylate.

5. An aqueous latex as in claim 2 wherein component (C) is methacrylic acid.

6. An aqueous latex containing interpolymer particles having an overall composition of from 6 to 18% by weight of acrylonitrile, from 20 to 45% by weight of 2-ethylhexyl acrylate, from 1 to 5% by weight of methacrylic acid and, correspondingly, from 32 to 73% by weight of styrene, wherein said interpolymer particles comprise an inner core of a particular interpolymer composition and an outer surface-oriented interpolymer of a different composition; said inner mass having an interpolymer composition of
- (1) from 20 to 40% by weight of acrylonitrile and, correspondingly,
- (2) from 80 to 60% by weight of styrene;

said outer surface-oriented interpolymer having a composition of
- (1) from 3 to 12% by weight of acrylonitrile,
- (2) from 25 to 50% by weight of 2-ethylhexyl acrylate,
- (3) from 1 to 5% by weight of methacrylic acid and, correspondingly,
- (4) from 71 to 33% by weight of styrene.

7. A process for preparing a latex which comprises sequentially interpolymerizing in an aqueous media (a) a first mixture of monomers and then when the interpolymerization of said first mixture of monomers is at least 60% complete, (b) a second mixture of monomers; said first mixture of monomers consisting of from 10 to 35 parts by weight of a mixture of
- (1) from 20 to 40% by weight of an unsaturated nitrile selected from the group consisting of acrylonitrile and methacrylonitrile, and correspondingly,
- (2) from 80 to 60% by weight of a monovinylidene aromatic hydrocarbon;

said second mixture of monomers consisting of, correspondingly, from 90 to 65 parts by weight of a mixture of
- (1) from 3 to 12% by weight of an unsaturated nitrile selected from the group consisting of acrylonitrile and methacrylonitrile,
- (2) from 25 to 50% by weight of an unsaturated ester selected from the group consisting of straight-chain and branched-chain saturated aliphatic alcohol esters of fumaric, acrylic and methacrylic acids containing from 5 to 20 carbon atoms in the alcohol moiety of which from about 5 to 14 carbon atoms comprise the longest continuous chain thereof,
- (3) from 1 to 5% by weight of an unsaturated monocarboxylic acid containing from 3 to 10 carbon atoms, and, correspondingly,
- (4) from 71 to 33% by weight of a monovinylidene aromatic hydrocarbon.

References Cited by the Examiner
UNITED STATES PATENTS 2,767,153  10/1956  Sutton _____ 260—29.5

MURRAY TILLMAN, *Primary Examiner.*

W. J. BRIGGS, *Assistant Examiner.*